(12) United States Patent
Miwa et al.

(10) Patent No.: US 10,724,456 B2
(45) Date of Patent: Jul. 28, 2020

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Koji Miwa, Shizuoka-ken (JP); Koichi Kitaura, Odawara (JP); Takahiro Tsukagoshi, Susono (JP); Kenji Inoshita, Okazaki (JP); Kazuya Suzuki, Susono (JP); Takeru Yoshida, Miyoshi (JP); Isao Chinzei, Toyota (JP); Kaoru Otsuka, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 60 days.

(21) Appl. No.: 15/985,073

(22) Filed: May 21, 2018

(65) Prior Publication Data
US 2018/0340481 A1 Nov. 29, 2018

(30) Foreign Application Priority Data

May 23, 2017 (JP) ................... 2017-101375

(51) Int. Cl.
| | |
|---|---|
| *F02D 41/02* | (2006.01) |
| *F01N 3/10* | (2006.01) |
| *F02D 41/04* | (2006.01) |
| *F02D 41/00* | (2006.01) |
| *F01N 9/00* | (2006.01) |

(Continued)

(52) U.S. Cl.
CPC ......... *F02D 41/0235* (2013.01); *F01N 3/101* (2013.01); *F01N 9/00* (2013.01); *F02D 41/0002* (2013.01); *F02D 41/0295* (2013.01); *F02D 41/042* (2013.01); *B60W 20/00* (2013.01); *F01N 2430/00* (2013.01); *F01N 2560/06* (2013.01); *F01N 2590/11* (2013.01); *F02D 2200/021* (2013.01); *F02N 11/0814* (2013.01)

(58) Field of Classification Search
CPC combination set(s) only.
See application file for complete search history.

(56) References Cited

U.S. PATENT DOCUMENTS

| | | |
|---|---|---|
| 5,979,157 A | 11/1999 | Kinugasa et al. |
| 6,131,680 A | 10/2000 | Nii et al. |

(Continued)

FOREIGN PATENT DOCUMENTS

| | | |
|---|---|---|
| JP | H04-153558 A | 5/1992 |
| JP | H09-308012 A | 11/1997 |

(Continued)

*Primary Examiner* — Binh Q Tran
(74) *Attorney, Agent, or Firm* — Hunton Andrews Kurth LLP (57) ABSTRACT

A vehicle includes an internal combustion engine including an exhaust passage, a catalyst provided in the exhaust passage, and an electronic control unit. When the engine stop condition is established, the electronic control unit stops fuel injection and increases a catalyst inflow oxygen amount that is an amount of oxygen flowing into the catalyst by a specified oxygen increase amount. The engine stop condition is a condition for stopping operation of the internal combustion engine. The specified oxygen increase amount is larger than an increased part of the catalyst inflow oxygen amount that is increased by the stop of the fuel injection.

7 Claims, 5 Drawing Sheets

(51) Int. Cl.
*B60W 20/00* (2016.01)
*F02N 11/08* (2006.01)

(56) References Cited

U.S. PATENT DOCUMENTS

| | | | |
|---|---|---|---|
| 6,772,723 B2 * | 8/2004 | Aoki | B60K 6/485 |
| | | | 123/179.4 |
| 6,792,750 B2 * | 9/2004 | Nagai | B01D 53/9495 |
| | | | 60/285 |
| 7,599,786 B2 * | 10/2009 | Utsumi | B60K 6/445 |
| | | | 701/112 |
| 7,997,365 B2 * | 8/2011 | Muta | B60L 58/12 |
| | | | 180/65.28 |
| 8,843,259 B2 * | 9/2014 | Nakagawa | B60K 6/445 |
| | | | 701/22 |
| 9,982,614 B2 * | 5/2018 | Hayashita | F01N 3/101 |
| 10,202,920 B2 * | 2/2019 | Tanaka | F01N 3/0814 |
| 2002/0052266 A1 | 5/2002 | Suzuki et al. | |
| 2010/0241297 A1 | 9/2010 | Aoki et al. | |
| 2013/0173103 A1 | 7/2013 | Ando et al. | |
| 2013/0226380 A1 | 8/2013 | Ando et al. | |
| 2013/0226439 A1 | 8/2013 | Hashemi | |

FOREIGN PATENT DOCUMENTS

| | | |
|---|---|---|
| JP | H100061426 A | 3/1998 |
| JP | 2002201983 A | 7/2002 |
| JP | 2003269223 A | 9/2003 |
| JP | 2009-126450 A | 6/2009 |
| JP | 2013-177026 A | 9/2013 |
| JP | 2014111923 A | 6/2014 |
| JP | 5862296 B2 | 2/2016 |

* cited by examiner

VEHICLE AND CONTROL METHOD FOR VEHICLE

INCORPORATION BY REFERENCE

The disclosure of Japanese Patent Application No. 2017-101375 filed on May 23, 2017 including the specification, drawings and abstract is incorporated herein by reference in its entirety.

BACKGROUND

1. Technical Field

The present disclosure relates to a vehicle that generates driving force for driving the vehicle and a control method for the vehicle.

2. Description of Related Art

When fuel injection is stopped in order to stop operation of an internal combustion engine (which is hereinafter referred to as "engine operation"), unburned fuel may adhere to the wall surface of an intake port and the wall surface of a combustion chamber. The unburned fuel may be released to the outside through an exhaust passage when the engine operation is stopped or while the engine operation is at a stopped state. Or the unburned fuel may be released, without being burned, to the outside through the exhaust passage when the engine operation is started after the engine operation is stopped.

To cope with such a situation, a control device (which is hereinafter referred to as "conventional device") for the internal combustion engine is known (see, for example, Japanese Patent Application Publication No. 4-153558). The control device is configured to perform combustion treatment of the unburned fuel adhering to the wall surfaces of the intake port and the combustion chamber after the engine operation is requested to be stopped and the fuel injection is stopped. The combustion treatment is performed by rotating the internal combustion engine with a starter motor while operating an ignition device.

SUMMARY

In an internal combustion engine mounted on a hybrid vehicle, engine operation is repeatedly stopped and started. In the internal combustion engine, an interval between start and stop of the engine operation may be relatively short. As a result, the temperature of the internal combustion engine (which is hereinafter referred to as "engine temperature") at the time when the engine operation is stopped may be relatively low. When the conventional device is applied to the internal combustion engine, the internal combustion engine is rotated with a starter motor while an ignition device is operated, after the engine operation is requested to be stopped and the fuel injection is stopped. However, since the engine temperature may be relatively low at the time of this treatment, combustion of the unburned fuel in the combustion chamber may become unstable. As a result, a large amount of unburned fuel may be released all at once from the internal combustion engine to the outside through the exhaust passage.

The present disclosure reduces the amount of unburned fuel released from the internal combustion engine to the outside through the exhaust passage, when the engine operation is stopped, and when the engine operation is started.

A first aspect of the present disclosure relates to a vehicle. The vehicle includes an internal combustion engine including an exhaust passage and is configured to oxidize unburned fuel and is configured to store oxygen, a catalyst provided in the exhaust passage, and an electronic control unit. When the electronic control unit determines that an engine stop condition is established, the electronic control unit is configured to stop fuel injection and to increase a catalyst inflow oxygen amount that is an amount of oxygen flowing into the catalyst by a specified oxygen increase amount. The engine stop condition is a condition for stopping operation of the internal combustion engine. The specified oxygen increase amount is larger than an increased part of the catalyst inflow oxygen amount that is increased by the stop of the fuel injection.

With the configuration, when the engine stop condition is established, the amount of oxygen flowing into the catalyst largely increases. Therefore, the amount of the unburned fuel oxidized by the catalyst increases. This makes it possible to reduce the amount of the unburned fuel released from the internal combustion engine to the outside through the catalyst when the engine operation is stopped.

In addition, according to the disclosure, a large amount of oxygen is supplied to the catalyst when the engine operation is stopped, so that the oxygen not consumed in the oxidation of the unburned fuel is stored in the catalyst. As a result, when the engine operation is started afterward, the catalyst has a large amount of oxygen stored therein. Therefore, even when the unburned fuel adhering to the wall surfaces of the intake port and the combustion chamber is released to the exhaust passage all at once when the engine operation is started, the catalyst can sufficiently oxidize the unburned fuel with the stored oxygen. Accordingly, it is possible to reduce the amount of the unburned fuel that is released from the internal combustion engine to the outside through the catalyst when the engine operation is started.

In the vehicle, the internal combustion engine may include a throttle valve. When the electronic control unit determines that the engine stop condition is established, the electronic control unit may be configured to increase the catalyst inflow oxygen amount by the specified oxygen increase amount by adjusting an opening degree of the throttle valve to be larger than an opening degree of the throttle valve at a time when the fuel injection is stopped.

The vehicle may further include an electric motor that rotates the internal combustion engine. When the electronic control unit determines that the engine stop condition is established, the electronic control unit may be configured to increase the catalyst inflow oxygen amount by the specified oxygen increase amount by rotating the internal combustion engine with the electric motor until a lapse of a first time. The first time may be longer than an estimated time during which an amount of the unburned fuel flowing into the catalyst becomes zero after the fuel injection is stopped.

In the vehicle, when the electronic control unit determines that the engine stop condition is established, the electronic control unit may be configured to increase the specified oxygen increase amount more as the temperature of the internal combustion engine is lower. With the configuration, when the electronic control unit determines that the engine stop condition is established and the temperature of the internal combustion engine is low, in particular lower than a specified temperature, the electronic control unit is configured to adjust the amount of the oxygen flowing into the catalyst to be larger than the amount of the oxygen flowing into the catalyst at a time when the temperature of the internal combustion engine is high, in particular higher than the specified temperature. Consequently, irrespective of the engine temperature, the unburned fuel released to the exhaust passage can sufficiently be oxidized by the catalyst.

In the vehicle, the internal combustion engine may include a throttle valve. When the electronic control unit determines that the engine stop condition is established, the electronic control unit may be configured to increase the catalyst inflow oxygen amount by the specified oxygen increase amount by adjusting an opening degree of the throttle valve to be larger by a specified opening degree than an opening degree of the throttle valve at the time when the fuel injection is stopped. The electronic control unit may also be configured to increase the specified oxygen increase amount by setting the specified opening degree to a larger value as the temperature of the internal combustion engine is lower.

The vehicle may further include an electric motor that rotates the internal combustion engine. When the electronic control unit determines that the engine stop condition is established, the electronic control unit may be configured to increase the catalyst inflow oxygen amount by the specified oxygen increase amount by rotating the internal combustion engine with the electric motor at a specified speed until a lapse of a first time. The electronic control unit may also be configured to increase the specified oxygen increase amount by increasing the specified speed more as the temperature of the internal combustion engine is lower. The first time may be longer than an estimated time during which an amount of the unburned fuel flowing into the catalyst becomes zero after the fuel injection is stopped.

The vehicle may further include an electric motor that rotates the internal combustion engine. When the electronic control unit determines that the engine stop condition is established, the electronic control unit may be configured to increase the catalyst inflow oxygen amount by the specified oxygen increase amount by rotating the internal combustion engine with the electric motor at a specified speed until a lapse of a first time. The electronic control unit may also be configured to increase the specified oxygen increase amount by increasing the first time more as the temperature of the internal combustion engine is lower. The first time may be longer than an estimated time during which an amount of the unburned fuel flowing into the catalyst becomes zero after the fuel injection is stopped.

In the vehicle, the electronic control unit may be configured to stop fuel injection at a time when a second time that is a preset time elapses after the electronic control unit determines that the engine stop condition is established. The electronic control unit may also be configured to set the second time to be shorter as a temperature of the internal combustion engine is lower.

With the configuration, the second time is the time until the fuel injection is stopped after the engine stop condition is established. The second time is set to be shorter when the temperature of the internal combustion engine is low than when the temperature of the internal combustion engine is high. Accordingly, when the temperature of the internal combustion engine is low, the fuel injection is stopped earlier than when the temperature of the internal combustion engine is high. As a result, when the engine temperature is low, the amount of oxygen flowing into the catalyst increases earlier than when the engine temperature is high. Consequently, irrespective of the engine temperature, the unburned fuel released to the exhaust passage can sufficiently be oxidized by the catalyst.

A second aspect of the present disclosure relates to a control method for a vehicle. The vehicle includes an internal combustion engine including an exhaust passage, a catalyst provided in the exhaust passage and being configured to oxidize unburned fuel and to store oxygen, and an electronic control unit. The control method includes, when the electronic control unit determines that an engine stop condition is established, the electronic control unit stopping fuel injection and increasing a catalyst inflow oxygen amount that is an amount of oxygen flowing into the catalyst by a specified oxygen increase amount. The engine stop condition is a condition for stopping operation of the internal combustion engine. The specified oxygen increase amount is larger than an increased part of the catalyst inflow oxygen amount that is increased by the stop of the fuel injection.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a control device (which is hereinafter referred to as "implementation device") for a vehicle drive system according to an embodiment of the present disclosure will be described with reference to the drawings. The implementation device is applied to a vehicle drive system mounted on a hybrid vehicle 100 illustrated in FIG. 1.

Figure 1:
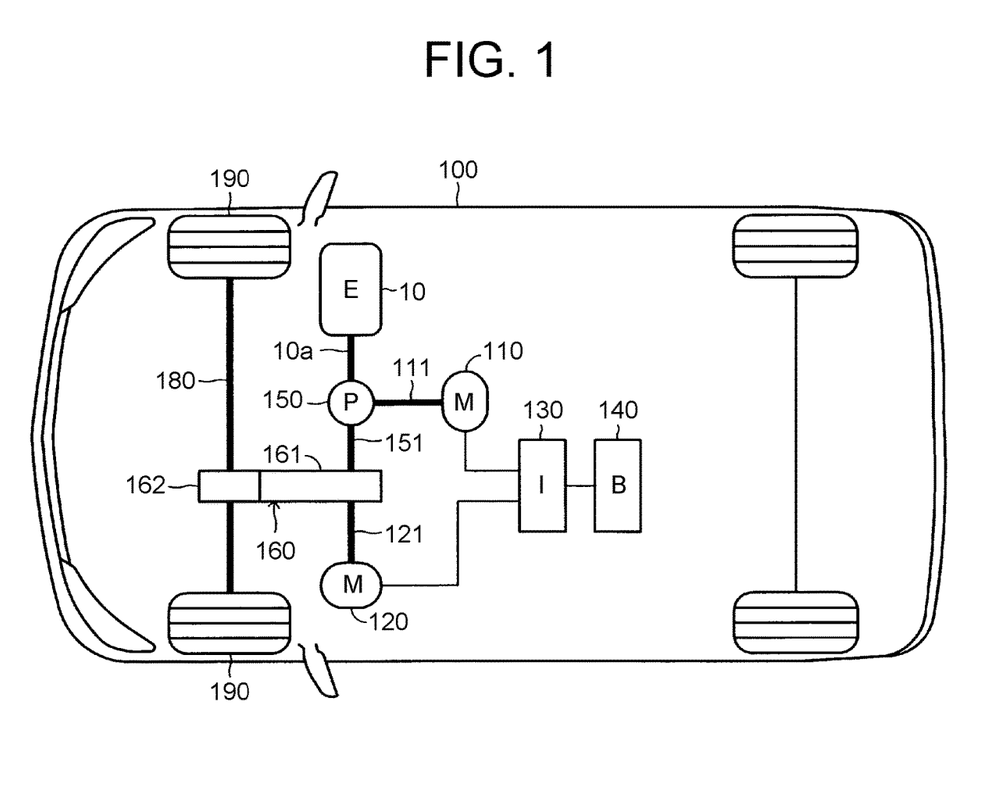
FIG. 1 illustrates a hybrid vehicle mounted with a vehicle drive system to which a control device (which is hereinafter referred to as "implementation device") according to an embodiment of the present disclosure is applied.

The vehicle drive system includes an internal combustion engine 10, a first motor-generator 110, a second motor-generator 120, an inverter 130, a battery (storage battery) 140, a motive power distribution mechanism 150, and a motive power transmission mechanism 160.

The motive power distribution mechanism 150 distributes torque (which is hereinafter referred to as "engine torque") output from the internal combustion engine 10 (which is hereinafter simply referred to as "engine 10") into "torque that rotates an output shaft 151 of the motive power distribution mechanism 150" and "torque that drives the first motor-generator 110 (which is hereinafter referred to as "first MG 110") as an electric generator" at a specified ratio (with a specified distribution property).

The motive power distribution mechanism 150 is constituted of an unillustrated planetary gear mechanism. The planetary gear mechanism includes a sun gear, a pinion gear, a pinion gear carrier, and a ring gear which are all not illustrated.

The pinion gear carrier has a rotary shaft connected with an output shaft 10a of the engine 10, so that engine torque is transmitted to the sun gear and the ring gear through the pinion gear. The sun gear has a rotary shaft connected with a rotary shaft 111 of the first MG 110, so that the engine torque input into the sun gear is transmitted to the first MG 110. When the engine torque is transmitted to the first MG 110 from the sun gear, the first MG 110 is rotated by the engine torque to generate electric power. The ring gear has a rotary shaft connected with an output shaft 151 of the motive power distribution mechanism 150. The engine torque input into the ring gear is transmitted from the motive power distribution mechanism 150 to the motive power transmission mechanism 160 through the output shaft 151.

The motive power transmission mechanism 160 is connected with the output shaft 151 of the motive power distribution mechanism 150 and with a rotary shaft 121 of the second motor-generator 120 (which is hereinafter referred to as "second MG 120"). The motive power transmission mechanism 160 includes a deceleration gear train 161 and a differential gear 162.

The deceleration gear train 161 is connected with a wheel driving shaft 180 through the differential gear 162. Therefore, "the engine torque input into the motive power transmission mechanism 160 from the output shaft 151 of the motive power distribution mechanism 150" and "the torque input into the motive power transmission mechanism 160 from the rotary shaft 121 of the second MG 120" are transmitted to right and left front wheels 190 serving as driving wheels through the wheel driving shaft 180. The motive power distribution mechanism 150 and the motive power transmission mechanism 160 are publicly known (see, for example, Japanese Patent Application Publication No. 2013-177026). The driving wheels may be right and left rear wheels, or may be right and left front wheels and rear wheels.

The first MG 110 and the second MG 120 are each permanent magnet synchronous motors that are connected with the inverter 130.

The first MG 110 is mainly used as a generator (electric generator). The first MG 110 performs cranking of the engine 10, when operation of the engine 10 (which is hereinafter referred to as "engine operation") is started. In order to stop the engine operation early, the first MG 110 further generates brake torque that is the torque in a direction opposite to the rotation direction of the engine 10.

The second MG 120 is mainly used as a motor (electric motor), which can generate torque for traveling of the vehicle 100.

Figure 3:
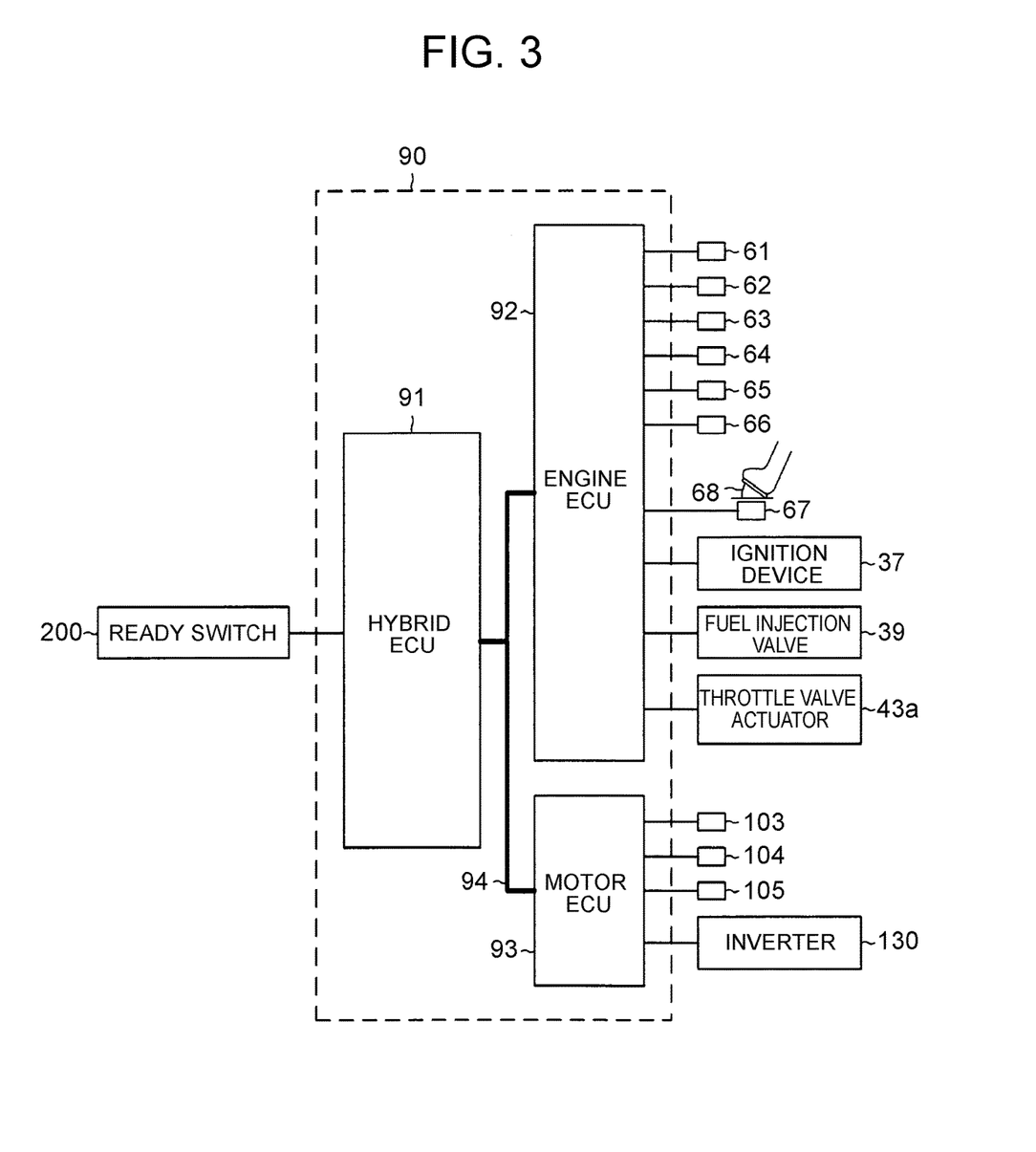
FIG. 3 illustrates an electronic control unit of the implementation device.

As illustrated in FIG. 3, an electronic control unit (ECU) 90 of the implementation device includes a hybrid ECU 91, an engine ECU 92, and a motor ECU 93. The term ECU is an abbreviation for electric control unit, which is an electronic control circuit having a microcomputer as a main component part, the microcomputer including a CPU, a ROM, a RAM, and an interface. The CPU implements later-described various functions by executing instructions (routines) stored in a memory (ROM).

The hybrid ECU 91, the engine ECU 92, and the motor ECU 93 are connected to each other through a communication and sensor-system controller area network (CAN) 94 so that the ECUs can exchange data (communicate) with each other. Two or all of the ECUs 91, 92, 93 may be integrated into one ECU.

The inverter 130 is connected to the motor ECU 93. The motor ECU 93 controls operation of the inverter 130. The motor ECU 93 controls the operation of the inverter 130 in response to a command from the hybrid ECU 91, and thereby controls operation of the first MG 110 and operation of the second MG 120.

When the first MG 110 is operated as a motor, the inverter 130 converts direct-current electric power supplied from the battery 140 into three-phase alternating-current electric power, and supplies the converted three-phase alternating-current electric power to the first MG 110. When the second MG 120 is operated as a motor, the inverter 130 converts the direct-current electric power supplied from the battery 140 into three-phase alternating-current electric power, and supplies the converted three-phase alternating-current electric power to the second MG 120.

When the rotary shaft 111 of the first MG 110 is rotated by external force, such as traveling energy or engine torque of the vehicle, the first MG 110 operates as an electric generator to generate electric power. When the first MG 110 operates as an electric generator, the inverter 130 converts the three-phase alternating-current electric power generated by the first MG 110 into direct-current electric power, and charges the battery 140 with the converted direct-current electric power.

When the traveling energy of the vehicle is input into the first MG 110 through the driving wheels 190, the wheel driving shaft 180, the motive power transmission mechanism 160, and the motive power distribution mechanism 150 as the external force, the first MG 110 can impart regenerative braking force (regenerative braking torque) to the driving wheels 190.

When the rotary shaft 121 of the second MG 120 is rotated by the external force, the second MG 120 operates as an electric generator to generate electric power. When the second MG 120 operates as an electric generator, the inverter 130 converts the three-phase alternating-current electric power generated by the second MG 120 into direct-current electric power, and charges the battery 140 with the converted direct-current electric power.

When the traveling energy of the vehicle is input into the second MG 120 through the driving wheels 190, the wheel driving shaft 180, and the motive power transmission mechanism 160 as the external force, the second MG 120 can impart regenerative braking force (regenerative braking torque) to the driving wheels 190.

A battery sensor 103, a first rotational angle sensor 104, and a second rotational angle sensor 105 are connected to the motor ECU 93.

The battery sensor 103 includes an electric current sensor, a voltage sensor, and a temperature sensor. The electric current sensor of the battery sensor 103 detects "electric current flowing into the battery 140", or "electric current flowing from the battery 140", and outputs a signal indicative of the electric current to the motor ECU 93. The voltage sensor of the battery sensor 103 detects voltage of the battery 140, and outputs a signal indicative of the voltage to the motor ECU 93. The temperature sensor of the battery sensor 103 detects temperature of the battery 140, and transmits a signal indicative of the temperature to the motor ECU 93.

The motor ECU 93 acquires an electric power amount SOC charged into the battery 140 (which is hereinafter referred to as "battery state of charge SOC") by a well-known method based on the signals output from the electric current sensor, the voltage sensor, and the temperature sensor.

The first rotational angle sensor 104 detects an angle of rotation of the first MG 110, and outputs a signal indicative of the angle of rotation to the motor ECU 93. The motor ECU 93 acquires a speed NM1 (which is hereinafter referred to as "first MG speed NM1") of the first MG 110 based on the signal.

The second rotational angle sensor 105 detects an angle of rotation of the second MG 120, and outputs a signal indicative of the angle of rotation to the motor ECU 93. The motor ECU 93 acquires a speed NM2 (which is hereinafter referred to as "second MG speed NM2") of the second MG 120 based on the signal.

Figure 2:
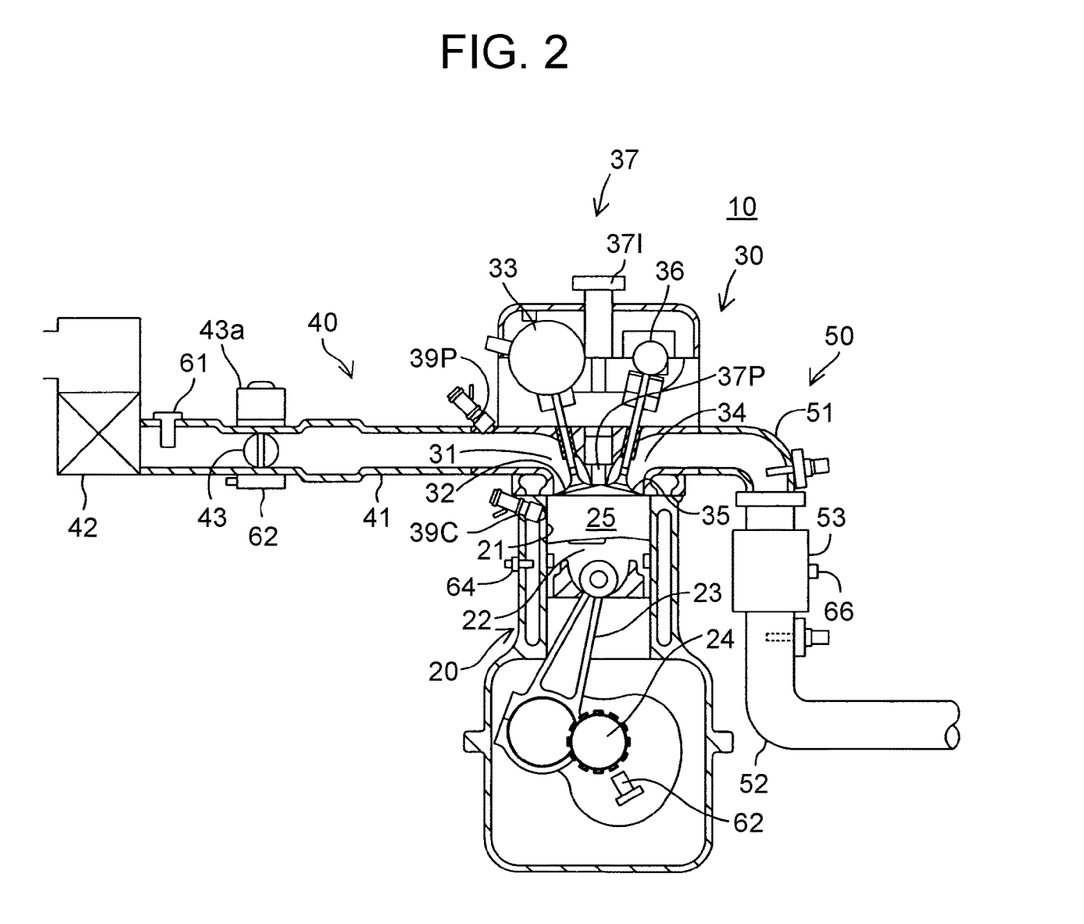
FIG. 2 illustrates an internal combustion engine illustrated in FIG. 1.

As illustrated in FIG. 2, the engine 10 is a multicylinder (in-series four-cylinder in the present example) four-cycle piston-reciprocating spark ignition-type gasoline engine. However, the engine 10 may be a multicylinder four-cycle piston-reciprocating compression ignition-type diesel engine. Although FIG. 2 illustrates only a section of one given cylinder, other cylinders also have the same configuration.

The engine 10 includes a cylinder block unit 20 including a cylinder block, a cylinder block lower case, and an oil pan. The engine 10 also includes a cylinder head unit 30, an air intake system 40, and an exhaust system 50 which are fixed to an upper portion of the cylinder block unit 20. The engine 10 further includes a port injection injector 39P and a direct injection injector 39C.

The cylinder block unit 20 includes a cylinder 21, a piston 22, a connection rod 23, and a crankshaft 24. The piston 22 reciprocates inside the cylinder 21, and the reciprocation movement of the piston 22 is transmitted to the crankshaft 24 through the connection rod 23. As a result, the crankshaft 24 rotates. The space surrounded with the cylinder 21, the head of the piston 22, and the cylinder head unit 30 forms a combustion chamber 25.

The cylinder head unit 30 includes two intake ports 31 (only one port is illustrated in FIG. 2) that communicate with the combustion chamber 25, two intake valves 32 (only one valve is illustrated in FIG. 2) that open and close the intake ports 31, respectively, and a variable valve timing mechanism (VVT) 33 that controls the rotation phase of an intake camshaft (illustration omitted) that drives each of the intake valves 32. The cylinder head unit 30 further includes two exhaust ports 34 (only one port is illustrated in FIG. 2) that communicate with the combustion chamber 25, two exhaust valves 35 (only one valve is illustrated in FIG. 2) that open and close the exhaust ports 34, respectively, and an exhaust camshaft 36 that drives each of the exhaust valves 35.

The cylinder head unit 30 further includes an ignition device 37 that generates an ignition spark in the combustion chamber 25. The ignition device 37 includes a spark plug 37P, and an igniter 371 including an ignition coil that generates high voltage to be given to the spark plug 37P.

To the port injection injector 39P, fuel boosted to a specified low pressure is supplied from an unillustrated fuel tank with an unillustrated low pressure fuel pump. The port injection injector 39P is provided to inject the low-pressure fuel into the intake ports 31, when the port injection injector 39P is opened.

To the direct injection injector 39C, fuel boosted to a specified high voltage is supplied from an unillustrated fuel tank with an unillustrated high-voltage fuel pump. The direct injection injector 39C is provided to directly inject the fuel into the combustion chamber 25.

Thus, the engine 10 is so-called a dual injection-type internal combustion engine. Hereinafter, the port injection injector 39P and the direct injection injector 39C may collectively be referred to as "fuel injection valve 39".

The air intake system 40 includes an intake pipe 41 including an intake manifold that is connected to the intake ports 31 of each cylinder. The air intake system 40 also includes an air filter 42 provided at an end portion of the intake pipe 41, a throttle valve 43 present in the intake pipe 41 to provide a variable suction port area, and an actuator 43a (which is hereinafter referred to as "throttle valve actuator 43a") that drives the throttle valve 43. The intake ports 31 and the intake pipe 41 constitute an intake passage.

The exhaust system 50 includes an exhaust manifold 51 connected to each of the exhaust ports 34 in each cylinder, an exhaust pipe 52 connected to the exhaust manifold 51, and a three-way catalyst 53 provided in the exhaust pipe 52. The exhaust ports 34, the exhaust manifold 51, and the exhaust pipe 52 constitute an exhaust passage.

The three-way catalyst 53 is a three-way catalytic device (exhaust gas cleaning catalyst) that carries an active ingredient made of noble metal such as platinum. The three-way catalyst 53 has an oxidation capacity for oxidizing unburned components, such as hydrocarbon (HC) and carbon monoxide (CO), and a reductive capacity for reducing nitrogen oxide (NOx), when gas flowing into the three-way catalyst 53 has a stoichiometric air-fuel ratio.

The three-way catalyst 53 further has an oxygen storage capacity for storing (reserving) oxygen. With the oxygen storage capacity, unburned components and NOx can be removed even when the air-fuel ratio shifts from the stoichiometric air-fuel ratio. The oxygen storage capacity is provided by ceria ($CeO_2$) carried on the three-way catalyst 53.

As illustrated in FIG. 3, the ignition device 37, the fuel injection valve 39, and the throttle valve actuator 43a are connected to the engine ECU 92. As described later, the engine ECU 92 controls operation of the ignition device 37, the fuel injection valve 39, and the throttle valve actuator 43a.

The engine 10 includes sensors such as an air flowmeter 61, a throttle position sensor 62, a crank position sensor 63, a coolant temperature sensor 64, a vehicle speed sensor 65, and a temperature sensor 66. These sensors are connected to the engine ECU 92.

The air flowmeter 61 detects a mass flow rate (intake air flow) Ga of the intake air flowing through the intake pipe 41, and outputs a signal indicative of the mass flow rate Ga to the engine ECU 92. The engine ECU 92 acquires the mass flow rate Ga based on the signal.

The throttle position sensor 62 detects an opening degree TA (which is hereinafter referred to as "throttle valve opening degree TA") of the throttle valve 43, and outputs a signal indicative of the throttle valve opening degree TA to the engine ECU 92. The engine ECU 92 acquires the throttle valve opening degree TA based on the signal.

The crank position sensor 63 outputs a pulse signal to the engine ECU 92, whenever the crankshaft 24 rotates a predetermined angle. The engine ECU 92 acquires a speed NE (which is hereinafter referred to as "engine speed NE") of the internal combustion engine based on the pulse signal.

The coolant temperature sensor 64 detects a temperature THW (which is hereinafter referred to as "coolant temperature THW") of coolant that cools the engine 10, and outputs a signal indicative of the coolant temperature THW to the engine ECU 92. The engine ECU 92 acquires the coolant temperature THW based on the signal.

The vehicle speed sensor 65 detects a speed V (which is hereinafter referred to as "vehicle speed V") of the vehicle 100, and outputs a signal indicative of the vehicle speed V to the engine ECU 92. The engine ECU 92 acquires the vehicle speed V based on the signal.

The temperature sensor 66 is provided on the catalyst 53. The temperature sensor 66 detects a temperature Tcat (which is hereinafter referred to as "catalyst temperature Tcat") of the catalyst 53, and outputs a signal indicative of the catalyst temperature Tcat to the engine ECU 92. The engine ECU 92 acquires the catalyst temperature Tcat based on the signal.

Furthermore, the engine ECU 92 is connected to an accelerator pedal operation amount sensor 67. The accelerator pedal operation amount sensor 67 detects an operation amount AP (which is hereinafter referred to as "accelerator pedal operation amount AP") of an accelerator pedal 68 operated by a driver of the vehicle, and outputs a signal indicative of the accelerator pedal operation amount AP to the engine ECU 92. The engine ECU 92 acquires the accelerator pedal operation amount AP based on the signal.

A ready switch 200 is connected to the hybrid ECU 91. When the ready switch 200 is set to an ON position, the ready switch 200 outputs a high signal to the hybrid ECU 91. When receiving the high signal, the hybrid ECU 91 determines that traveling of the vehicle 100 is permitted. When the ready switch 200 is set to an OFF position, the ready switch 200 outputs a low signal to the hybrid ECU 91. When receiving the low signal, the hybrid ECU 91 determines that traveling of the vehicle 100 is prohibited.

A description is now given of the control of the engine 10, the first MG 110, and the second MG 120 performed by the implementation device when the ready switch 200 is set to the ON position.

When the ready switch 200 is set to the ON position, i.e., when traveling of the vehicle 100 is permitted, the hybrid ECU 91 of the implementation device acquires a request torque TQreq based on the accelerator pedal operation amount AP and the vehicle speed V. The request torque TQreq is torque requested by the driver as driving torque that is given to the driving wheels 190 to drive the driving wheels 190.

The hybrid ECU 91 multiplies the request torque TQreq by the second MG speed NM2 to calculate an output Pdrv (which is hereinafter referred to as "request driving output Pdrv") to be input into the driving wheels 190.

Based on a difference ΔSOC (=SOCtgt−SOC) between a target value SOCtgt of the battery state of charge SOC (which is hereinafter referred to as "target state of charge SOCtgt") and a current battery state of charge SOC, the hybrid ECU 91 acquires an output Pchg (which is hereinafter referred to as "request charge output Pchg") to be input into the first MG 110 so as to approximate the battery state of charge SOC to the target state of charge SOCtgt.

The hybrid ECU 91 calculates a sum total of the request drive output Pdrv and the request charge output Pchg as an output Peng_req (which is hereinafter referred to as "request engine output Peng_req") to be output from the engine 10.

The hybrid ECU 91 determines whether or not the request engine output Peng_req is smaller than a "lower limit Peng_min of an optimum operation output of the engine 10". The lower limit Peng_min of the optimum operation output of the engine 10 (which is hereinafter referred to as "minimum engine output Peng_min") is a minimum value of the output with which the engine 10 can operate at an efficiency equal to or above a specified efficiency. The optimum operation output is defined by a combination of "optimum engine torque TQopt and optimum engine speed NEopt". The optimum engine torque TQopt and the optimum engine speed NEopt are engine torque TQeng and engine speed NE that enable the engine 10 to operate at the efficiency equal to or above the specified efficiency, respectively.

The hybrid ECU 91 determines whether or not all of conditions C1 to C3 described below are established, when the request engine output Peng_req is smaller than the minimum engine output Peng_min.

Condition C1: the battery state of charge SOC is equal to or above a threshold state of charge SOCth. Condition C2: there is no request for heating the vehicle cabin of the vehicle 100. Condition C3: the catalyst temperature Tcat is equal to or above a threshold active temperature Tcat_th.

When all the conditions C1 to C3 are established, the hybrid ECU 91 determines that an engine stop condition is established. When any one of the conditions C1 to C3 are not established, the hybrid ECU 91 determines that an engine operating condition is established. Furthermore, when the request engine output Peng is equal to or above the minimum engine output Peng_min, the hybrid ECU 91 determines that the engine operating condition is established.

When the engine operating condition is established, the hybrid ECU 91 sets a target value of the optimum engine torque TQopt and a target value of the optimum engine speed NEopt for making the engine 10 output the request engine output Peng_req, as a target engine torque TQeng_tgt and a target engine speed NEtgt, respectively. In this case, the target engine torque TQeng_tgt and the target engine speed NEtgt are each set to values larger than zero.

The hybrid ECU 91 further sets a target first MG torque TQmg1_tgt based on parameters such as the target engine torque TQeng_tgt, the target engine speed NEtgt, the first MG speed NM1, and the second MG speed NM2 by a well-known method. In addition, the hybrid ECU 91 sets a target second MG torque TQmg2_tgt based on parameters such as the request torque TQreq and the target engine torque TQeng_tgt by a well-known method.

The method for setting "the request engine output Peng_req, the target engine torque TQeng_tgt, the target engine speed NEtgt, the target first MG torque TQmg1_tgt, and the target second MG torque TQmg2_tgt" and the method for determining whether or not the engine operating condition is established are publicly known by, for example, JP 2013-177026 A, Japanese Patent No. 5862296, Japanese Patent No. 5682581, Japanese Patent Application Publication No. 2009-126450, and Japanese Patent Application Publication No. 9-308012.

The hybrid ECU 91 sends out the data of the set target engine torque TQeng_tgt and target engine speed NEtgt to the engine ECU 92. The hybrid ECU 91 also sends out the data of the set target first MG torque TQmg1_tgt and target second MG torque TQmg2_tgt to the motor ECU 93.

The engine ECU 92 controls the throttle valve opening degree TA, injection of fuel (which is hereinafter referred to as "fuel injection") from the fuel injection valve 39, and ignition (which is hereinafter referred to as "fuel ignition") by the ignition device 37 based on the received data so as to achieve the target engine torque TQeng_tgt and the target engine speed NEtgt.

The control of fuel injection includes control of the amount of fuel injected from the fuel injection valve 39 and control of the timing of injecting the fuel from the fuel injection valve 39. The control of fuel ignition includes control of the timing of ignition by the ignition device 37.

The engine ECU 92 calculates, based on parameters such as engine speed NE, engine load KL, and coolant temperature THW, a target value of the amount of the fuel injected from the fuel injection valve 39 (which is hereinafter referred to as "target fuel injection amount") by the well-known method. The engine ECU 92 then determines "a ratio of the amount of fuel injected from the direct injection injector 39C to the target fuel injection amount" and "a ratio of the amount of fuel injected from the port injection injector 39P to the target fuel injection amount".

Meanwhile, the motor ECU 93 controls operation of the first MG 110 and the second MG 120 by controlling the inverter 130 so as to achieve the target first MG torque TQmg1_tgt and the target second MG torque TQmg2_tgt based on the received data.

When the engine operating condition is not established, that is, when the condition (which is hereinafter referred to as "engine stop condition") for stopping the operation of the engine 10 is established (see time t40 of FIG. 4), the hybrid ECU 91 sets the optimum engine torque TQopt and the optimum engine speed NEopt corresponding to the minimum engine output Peng_min, as the target engine torque TQeng_tgt and the target engine speed NEtgt, respectively, until a point of time (see time t41 of FIG. 4) when time Tidle (which is hereinafter referred to as "idling time Tidle"), elapsed after the engine stop condition is determined to be established, reaches a specified time Tidle_th.

Figure 4:
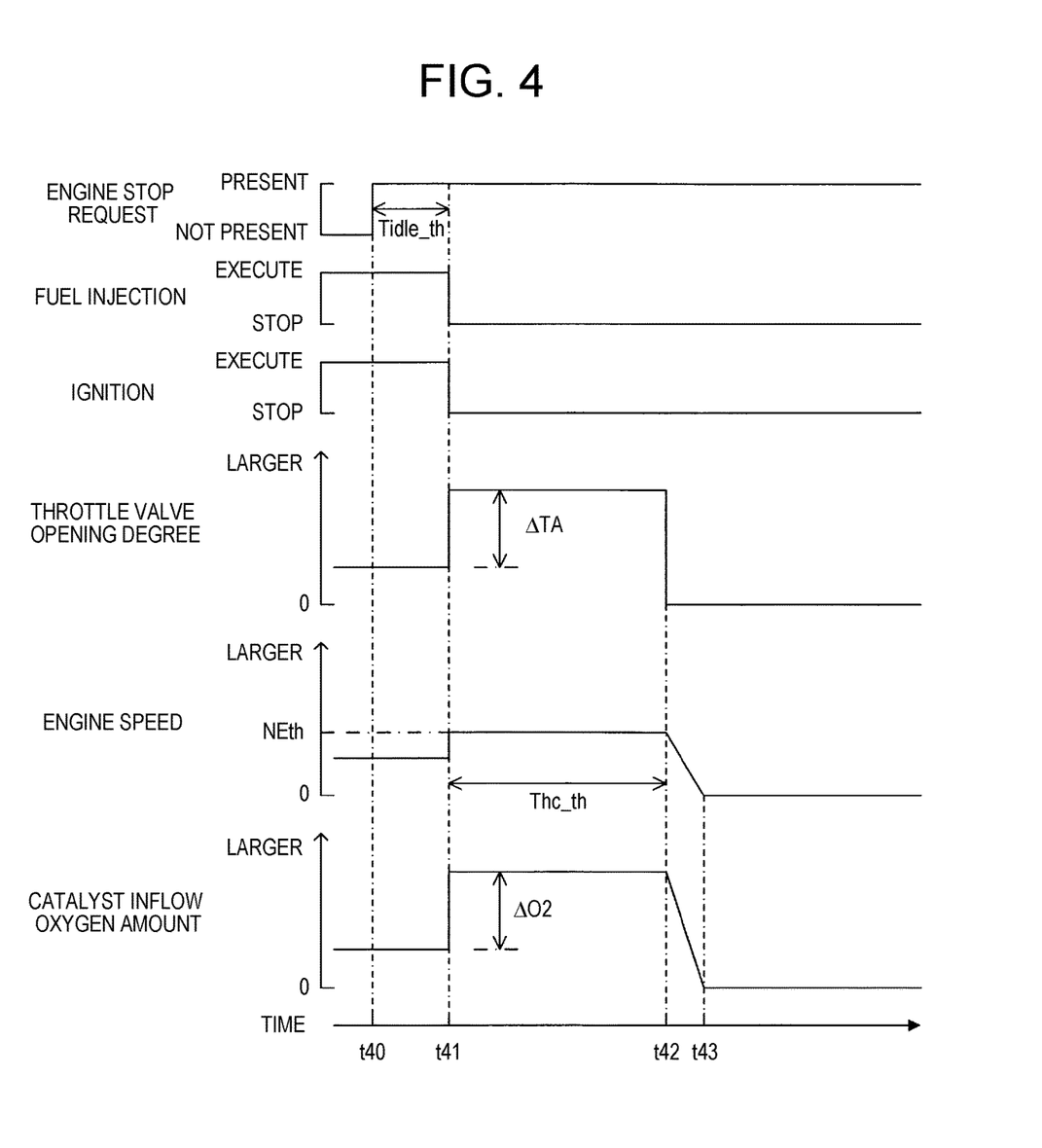
FIG. 4 is a time chart for describing the control performed by the implementation device when the operation of the internal combustion engine is requested to be stopped.

The hybrid ECU 91 further sets the target first MG torque TQmg1_tgt and the target second MG torque TQmg2_tgt by the well-known method as described before.

The hybrid ECU 91 estimates a temperature Teng of the engine 10 (which is hereinafter referred to as "engine temperature Teng") based on the coolant temperature THW. When the estimated engine temperature Teng is low, the hybrid ECU 91 sets the specified time Tidle_th to a smaller value than when the estimated engine temperature Teng is high. In the present example in particular, the hybrid ECU 91 sets the specified time Tidle_th to be a smaller value as the estimated engine temperature Teng is lower.

However, the hybrid ECU 91 may be configured to set the specified time Tidle_th to a smaller value when the coolant temperature THW is low than when the coolant temperature THW is high. Or irrespective of the estimated engine temperature Teng, the hybrid ECU 91 may be configured to set the specified time Tidle_th to zero.

The hybrid ECU 91 sends out the data of the set target engine torque TQeng_tgt and target engine speed NEtgt to the engine ECU 92. The hybrid ECU 91 also sends out the data of the set target first MG torque TQmg1_tgt and target second MG torque TQmg2_tgt to the motor ECU 93.

The engine ECU 92 controls the throttle valve opening degree TA, the fuel injection, and the fuel ignition so as to achieve the target engine torque TQeng_tgt and the target engine speed NEtgt based on the received data. Meanwhile, the motor ECU 93 controls operation of the first MG 110 and the second MG 120 by controlling the inverter 130 so as to achieve the target first MG torque TQmg1_tgt and the target second MG torque TQmg2_tgt based on the received data.

When the idling time Tidle reaches the specified time Tidle_th (see time t41 of FIG. 4), the hybrid ECU 91 sets each of the target engine torque TQeng_tgt and the target engine speed NEtgt to zero.

Furthermore, the hybrid ECU 91 sets as a target throttle valve opening degree TAtgt an opening degree larger by a specified opening degree $\Delta TA$ than a target throttle valve opening degree TAtgt at the time when the engine stop condition is established. The hybrid ECU 91 estimates the temperature Teng of the engine 10 (which is hereinafter referred to as "engine temperature Teng") based on the coolant temperature THW. When the estimated engine temperature Teng is low, the hybrid ECU 91 sets the specified opening degree $\Delta TA$ to a larger value than when the estimated engine temperature Teng is high. In the present example in particular, the hybrid ECU 91 sets the specified opening degree $\Delta TA$ to be a larger value as the estimated engine temperature Teng is lower.

The hybrid ECU 91 may be configured to set the specified opening degree $\Delta TA$ to a larger value when the coolant temperature THW is low than when the coolant temperature THW is high.

In addition, the hybrid ECU 91 sets as the target first MG torque TQmg1_tgt the first MG torque TQmg1 that is necessary for maintaining the engine speed NE at a specified speed NEth after the stop of the fuel injection. The hybrid ECU 91 estimates the engine temperature Teng based on the coolant temperature THW. When the estimated engine temperature Teng is low, the hybrid ECU 91 sets the specified speed NEth to a larger value than when the estimated engine temperature Teng is high. In the present example in particular, the hybrid ECU 91 sets the specified speed NEth to be a larger value as the estimated engine temperature Teng is lower.

The hybrid ECU 91 may be configured to set the specified speed NEth to a larger value when the coolant temperature THW is low than when the coolant temperature THW is high.

The hybrid ECU 91 further sets the target second MG torque TQmg2_tgt by the well-known method as described before.

The hybrid ECU 91 sends out the data of the set target engine torque TQeng_tgt, target engine speed NEtgt, and target throttle valve opening degree TAtgt to the engine ECU 92. The hybrid ECU 91 also sends out the set target first MG torque TQmg1_tgt and target second MG torque TQmg2_tgt to the motor ECU 93.

The engine ECU 92 controls operation of the throttle valve 43, the fuel injection valve 39, and the ignition device 37 so as to achieve the target engine torque TQeng_tgt, the target engine speed NEtgt, and the target throttle valve opening degree TAtgt based on the received data. In this case, since each of the target engine torque TQeng_tgt and the target engine speed NEtgt is zero, the engine ECU 92 stops fuel injection by the fuel injection valve 39 and ignition by the ignition device 37.

Meanwhile, the motor ECU 93 controls operation of the first MG 110 and the second MG 120 by controlling the operation of the inverter 130 so as to achieve the target first MG torque TQmg1_tgt and the target second MG torque TQmg2_tgt based on the received data.

Accordingly, fuel injection and fuel ignition are stopped, the throttle valve opening degree TA is increased, and the engine speed NE is maintained at the specified speed NEth by the first MG 110. By stopping the fuel injection, the amount of oxygen flowing into the catalyst 53 (catalyst inflow oxygen amount) drastically increases. In addition, since the throttle valve opening degree TA is increased, the catalyst inflow oxygen amount is increased by an amount $\Delta O2$ that is still larger than the catalyst inflow oxygen amount increased by the stop of fuel injection.

Therefore, even when a large amount of unburned fuel adhering to the wall surfaces of the intake port 31 and the combustion chamber 25 flows into the catalyst 53, the unburned fuel is sufficiently oxidized by the catalyst 53. Accordingly, it is possible to reduce the amount of the unburned fuel flowing to the downstream of the catalyst 53 when engine operation is stopped.

Furthermore, since a large amount of oxygen is supplied to the catalyst 53, some of the supplied oxygen is stored in the catalyst 53 without being consumed in oxidation treatment of the unburned fuel. Therefore, even when the unburned fuel adhering to the wall surfaces of the intake port 31 and the combustion chamber 25 is released to the exhaust passage all at once and flows into the catalyst 53 when the engine operation is started later, the catalyst 53 can sufficiently oxidize the unburned fuel with use of the stored oxygen. Accordingly, it is possible to reduce the amount of the unburned fuel flowing out to the downstream of the catalyst 53 when the engine operation is started.

The hybrid ECU 91 sets the target throttle valve opening degree TAtgt to zero, and also sets each of the target engine torque TQeng_tgt and the target engine speed NEtgt to zero at a point of time (see time t42 of FIG. 4.) when a time Thc_th, lapsed after the stop of the fuel injection, reaches a specified time Thc_th. The hybrid ECU 91 further sets the target first MG torque TQmg1_tgt and the target second MG torque TQmg2_tgt by the well-known method as described before.

In the present example, the hybrid ECU 91 sets the specified time Thc_th as the time that is longer than an estimated time during which the amount of the unburned fuel flowing into the catalyst 53 becomes zero after the engine stop condition is established and fuel injection is stopped. Furthermore, when an estimated engine temperature Teng is low, the hybrid ECU 91 sets the specified time Thc_th to a larger value than when the estimated engine temperature Teng is high. In the present example in particular, the hybrid ECU 91 sets the specified time Thc_th to be a larger value as the estimated engine temperature Teng is lower.

The hybrid ECU 91 may be configured to set the specified time Thc_th to a larger value when the coolant temperature THW is low than when the coolant temperature THW is high.

The hybrid ECU 91 sends out the data of the set target throttle valve opening degree TAtgt, target engine torque TQeng_tgt and target engine speed NEtgt to the engine ECU 92. The hybrid ECU 91 also sends out the data of the set target first MG torque TQmg1_tgt and target second MG torque TQmg2_tgt to the motor ECU 93.

The engine ECU 92 controls operation of the throttle valve 43, the fuel injection valve 39, and the ignition device 37 so as to achieve the target throttle valve opening degree TAtgt, the target engine torque TQeng_tgt, and the target engine speed NEtgt based on the received data. In this case, the throttle valve 43 is fully closed, and the engine 10 stops rotation.

Meanwhile, the motor ECU 93 controls operation of the first MG 110 and the second MG 120 by controlling the inverter 130 so as to achieve the target first MG torque TQmg1_tgt and the target second MG torque TQmg2_tgt based on the received data.

Accordingly, the engine speed NE becomes zero, and the catalyst inflow oxygen amount also becomes zero.

A description is now given of a specific operation of the implementation device. The CPU of the hybrid ECU 91 (which is hereinafter simply referred to as "CPU") in the implementation device executes a routine in the flowchart illustrated in FIG. 5 whenever a predetermined time elapses.

Figure 5:
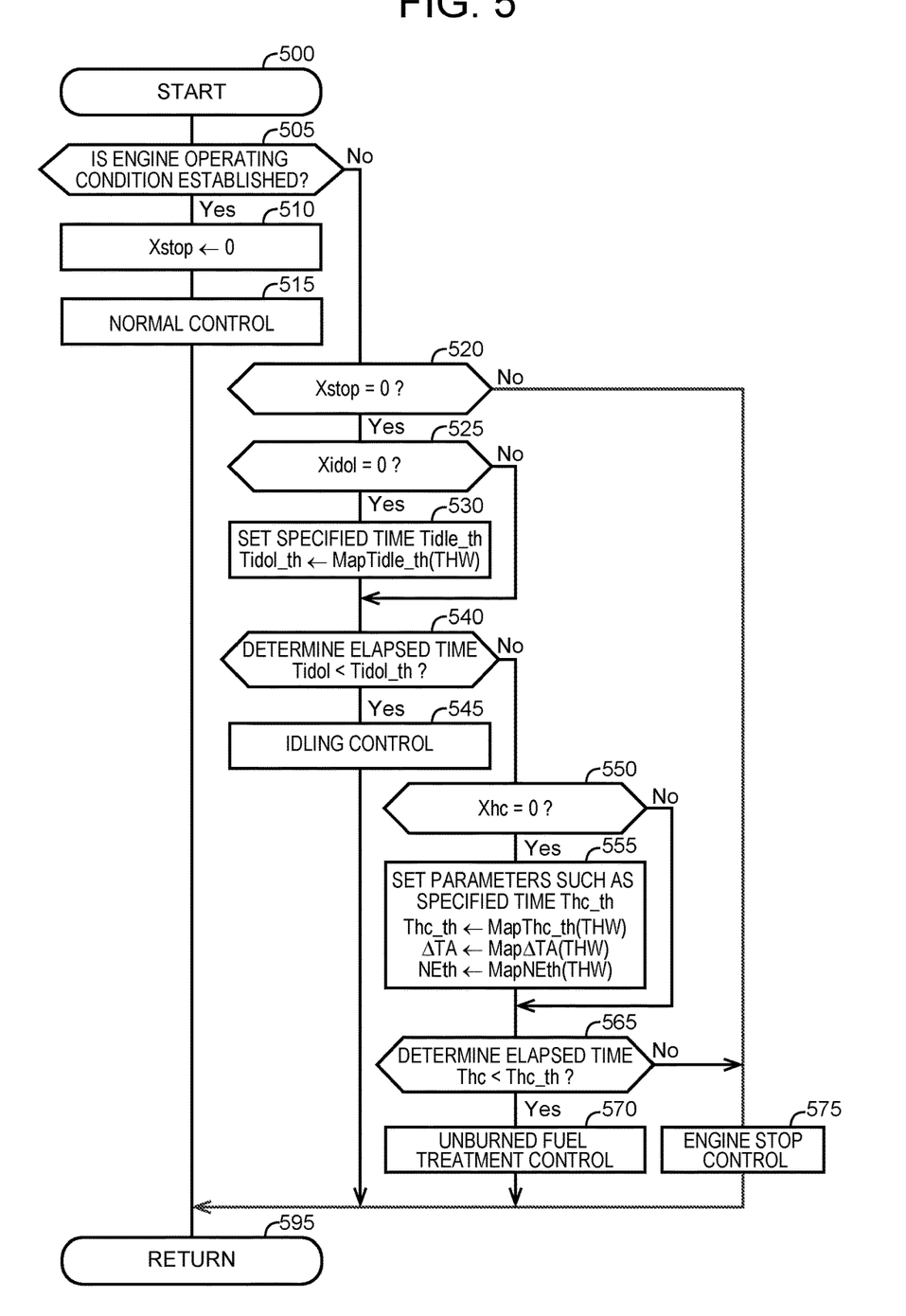
FIG. 5 is a flowchart illustrating a routine executed by a CPU of a hybrid ECU (which is hereinafter simply referred to as "CPU") of the implementation device.

Therefore, at a specified timing, the CPU starts processing in step 500 of FIG. 5, and advances the processing to step 505 to determine whether or not the engine operating condition is established. When the engine operating condition is established, the CPU determines "Yes" in step 505, and advances the processing to step 510 to set the value of an operation stop flag Xstop to "0".

The operation stop flag Xstop is a flag indicating whether or not the engine operation is started after the engine operation is stopped. When the value of the operation stop flag Xstop is "0", it indicates that the engine operation is started after the engine operation is stopped. When the value is "1", it indicates that engine operation is not started after the engine operation is stopped. The value of the operation stop flag Xstop is set to "1", when engine operation is stopped by later-described processing of step 575.

The CPU then advances the processing to step 515 to set the optimum engine torque TQopt and the optimum engine speed NEopt as the target engine torque TQeng_tgt and the target engine speed NEtgt, respectively, and to send out the data to the engine ECU 92. In step 515, the CPU also sets the target first MG torque TQmg1_tgt and the target second MG torque TQmg2_tgt, and sends out the data to the motor ECU 93.

The engine ECU 92 controls operation of the throttle valve 43, the fuel injection valve 39, and the ignition device 37 so as to achieve the target engine torque TQeng_tgt and the target engine speed NEtgt based on the received data. Meanwhile, the motor ECU 93 controls operation of the first MG 110 and the second MG 120 by controlling the operation of the inverter 130 so as to achieve the target first MG torque TQmg1_tgt and the target second MG torque TQmg2_tgt based on the received data.

When the engine operating condition is not established, i.e., when the engine stop condition is established at a point of time when the CPU executes processing of step 505, the CPU determines "No" in step 505, and advances the processing to step 520 to determine whether or not the value of the operation stop flag Xstop is "0".

When the value of the operation stop flag Xstop is "0", the CPU determines "Yes" in step 520, and advances the processing to step 525 to determine whether or not the value of an idling flag Xidle is "0".

The idling flag Xidle is a flag indicating whether or not idling operation of the engine 10 performed in later-described processing of step 545 is started. When the value of the idling flag Xidle is "0", it indicates that the idling operation of the engine 10 is not started. When the value of the idling flag Xidle is "1", it indicates that the idling operation of the engine 10 is started. The value of the idling flag Xidle is set to "1" when idling control performed in later-described processing of step 545 is started. The value of the idling flag Xidle is set to "0" when the engine stop control performed in later-described processing of step 575 is started.

When the CPU advances the processing to step 525 for the first time after the engine operation is started and then the CPU determines "No" in step 505, the value of the idling flag Xidle is zero. Therefore, in that case, the CPU determines "Yes" in step 525, and performs processing of step 530 described below. Then, the CPU advances the processing to step 540.

Step 530: the CPU acquires the specified time Tidle_th by applying the coolant temperature THW to a look-up table MapTidle_th (THW). According to the table MapTidle_th (THW), the specified time Tidle_th is acquired as a smaller value as the coolant temperature THW is lower.

Meanwhile, when the idling control performed in the processing of step 545 has already been started at the time when the CPU executes the processing of step 525, the value of the idling flag Xidle is "1". Therefore, in that case, the CPU determines "No" in step 525, and advances the processing directly to step 540.

When the CPU advances the processing to step 540, the CPU determines whether or not time Tidle (idling time Tidle), elapsed after the start of the idling control by the later-described processing of step 545, is shorter than the specified time Tidle_th When the CPU determines "No" for the first time in step 505 after the start of the engine operation, the idling control by the processing of step 545 is not started. In that case, the idling time Tidle is shorter than the specified time Tidle_th. In that case, therefore, the CPU determines "Yes" in step 540, and advances the processing to step 545.

When the CPU advances the processing to step 545, the CPU sets the optimum engine torque TQopt_min and the optimum engine speed NEopt_min corresponding to the minimum engine output Peng_min as the target engine torque TQeng_tgt and the target engine speed NEtgt, respectively, and sends out the data to the engine ECU 92. The CPU also sets the target first MG torque TQmg1_tgt and the target second MG torque TQmg2_tgt, sends out the data to the motor ECU 93, and sets the value of the idling flag Xidle to "1".

The engine ECU 92 controls operation of the throttle valve 43, the fuel injection valve 39, and the ignition device 37 so as to achieve the target engine torque TQeng_tgt and the target engine speed NEtgt based on the received data. As a consequence, idling operation of the engine 10 is performed.

Meanwhile, the motor ECU 93 controls operation of the first MG 110 and the second MG 120 by controlling the operation of the inverter 130 so as to achieve the target first MG torque TQmg1_tgt and the target second MG torque TQmg2_tgt based on the received data.

When the idling time Tidle reaches the specified time Tidle_th after the idling control by the processing of step 545 is started, the CPU determines "No" in step 540, and advances the processing to step 550 to determine whether or not the value of an unburned fuel treatment flag Xhc is "0".

The unburned fuel treatment flag Xhc is a flag indicating whether or not the unburned fuel treatment control performed in the later-described step 570 is started after the engine stop condition is established. When the value of the unburned fuel treatment flag Xhc is "0", it indicates that the unburned fuel treatment control is not started. When the value of the unburned fuel treatment flag Xhc is "1", it indicates that the unburned fuel treatment control is started. The value of the unburned fuel treatment flag Xhc is set to "1" by the unburned fuel treatment control performed in the later-described processing of step 570. The value of the unburned fuel treatment flag Xhc is set to "0" by the engine stop control performed in the later-described processing of step 575.

When the CPU determines "No" for the first time in step 540 after the engine stop condition is established, the unburned fuel treatment control performed in the processing of step 570 is not started. Accordingly, the value of the unburned fuel treatment flag Xhc is "0". Therefore, in that case, the CPU determines "Yes" in step 550, and performs processing of step 555 described below. Then, the CPU advances the processing to step 565.

Step 555: the CPU acquires the specified time Thc_th by applying the coolant temperature THW to a look-up table MapThc_th (THW), acquires the specified opening degree ΔTA by applying the coolant temperature THW to a look-up table MapΔTA (THW), and acquires the specified speed NEth by applying the coolant temperature THW to a look-up table MapNEth (THW).

According to the table MapThc_th (THW), the specified time Thc_th is acquired as a larger value as the coolant temperature THW is lower. According to the table MapΔTA (THW), the specified opening degree ΔTA is acquired as a larger value as the coolant temperature THW is lower.

According to the table MapNEth (THW), the specified speed NEth is acquired as a larger value as the coolant temperature THW is lower.

When the unburned fuel treatment control in the processing of step 570 has already been started at the time when the CPU executes the processing of step 550, the value of the unburned fuel treatment flag Xhc is "1". Therefore, in that case, the CPU determines "No" in step 550, and advances the processing directly to step 565.

When the CPU advances the processing to step 565, the CPU determines whether or not the time Thc (which is hereinafter referred to as "unburned fuel treatment time Thc"), elapsed after the start of the unburned fuel treatment control performed in the processing of step 570, is shorter than the specified time Thc_th.

When the CPU advances the processing to step 565 for the first time after "No" is determined in step 505, the unburned fuel treatment control in the processing of step 570 is not started. Hence, the unburned fuel treatment time Thc is shorter than the specified time Thc_th. Therefore, in that case, the CPU determines "Yes" in step 565, and advances the processing to step 570.

When the CPU advances the processing to step 570, the CPU sets each of the target engine torque TQeng_tgt and the target engine speed NEtgt to zero, and sends out the data to the engine ECU 92. The CPU also sets as the target throttle valve opening degree TAtgt an opening degree TAset obtained by adding the specified opening degree ΔTA to the target throttle valve opening degree TAtgt at the present moment, and sends out the data to the engine ECU 92.

The CPU further sets the first MG torque TQmg1 for maintaining the engine speed NE at the specified engine speed NEth as the target first MG torque TQmg1_tgt, and sends out the data to the motor ECU 93. The CPU also sets the target second MG torque TQmg2_tgt, and sends out the data to the motor ECU 93. In addition, the CPU sets the value of the unburned fuel treatment flag Xhc to "1".

The engine ECU 92 controls operation of the throttle valve 43, the fuel injection valve 39, and the ignition device 37 so as to achieve the target engine torque TQeng_tgt, the target engine speed NEtgt, and the target throttle valve opening degree TAtgt based on the received data. At that time, since each of the target engine torque TQeng_tgt and the target engine speed NEtgt is zero, the fuel injection valve 39 and the ignition device 37 are not operated.

Meanwhile, the motor ECU 93 controls operation of the first MG 110 and the second MG 120 by controlling the operation of the inverter 130 so as to achieve the target first MG torque TQmg1_tgt and the target second MG torque TQmg2_tgt based on the received data.

When the unburned fuel treatment time Thc reaches the specified time Thc_th after the unburned fuel treatment control in the processing of step 570 is started, the CPU determines "No" in step 565, and advances the processing to step 575.

When the CPU advances the processing to step 575, the CPU sets each of the target engine torque TQeng_tgt, the target engine speed NEtgt and the target throttle valve opening degree TAtgt to zero, and sends out the data to the engine ECU 92. The CPU also sets the target first MG torque TQmg1_tgt and the target second MG torque TQmg2_tgt, and sends out the data to the motor ECU 93.

In addition, the CPU sets the value of the idling flag Xidle to "0", sets the value of the unburned fuel treatment flag Xhc to "0", and sets the value of the operation stop flag Xstop to "1".

The engine ECU 92 controls operation of the throttle valve 43, the fuel injection valve 39, and the ignition device 37 so as to achieve the target engine torque TQeng_tgt, the target engine speed NEtgt, and the target throttle valve opening degree TAtgt based on the received data. In this case, the engine 10 stops rotation.

Meanwhile, the motor ECU 93 controls operation of the first MG 110 and the second MG 120 by controlling the operation of the inverter 130 so as to achieve the target first MG torque TQmg1_tgt and the target second MG torque TQmg2_tgt based on the received data.

When the operation stop flag Xstop is "1" at the time when the CPU executes the processing of step 520, the CPU determines "No" in step 520 and advances the processing to step 575.

The specific operation of the implementation device has been described. As described in the foregoing, a large amount of oxygen is supplied to the catalyst 53 for the specified time Thc_th after the engine stop condition is established. Accordingly, even when the unburned fuel adhering to the wall surfaces of the intake port 31 and the combustion chamber 25 flows into the catalyst 53, the catalyst 53 can sufficiently oxidize the unburned fuel.

Furthermore, some oxygen, in a large amount of oxygen flowing into the catalyst 53, is not consumed in the oxidation treatment of the unburned fuel and is stored in the catalyst 53. Therefore, even when a large amount of unburned fuels flow into the catalyst 53 when engine operation is started later, the catalyst 53 can sufficiently oxidize the unburned fuel with the stored oxygen.

The present disclosure is not limited to the embodiment disclosed, and various modifications can be adopted within the range of the present disclosure.

For example, when the vehicle 100 mounted with the engine 10 is a vehicle that executes start and stop control (which is hereinafter referred to as "S&S control") of the engine 10, the present disclosure may be applied to the engine 10.

As publicly known, in the S&S control, the engine operation is stopped when a specified engine stop condition is established, and the engine operation is resumed when a specified engine restart condition is established. That is, according to the S&S control, the present disclosure can be applied when intermittent operation of the internal combustion engine is performed and the engine stop condition is established. For example, in the S&S control, the engine stop condition is established when a brake device is in operation and the vehicle speed becomes a specified speed or less (for example, zero). For example, in the case where the vehicle is an automatic vehicle in the S&S control, the engine restart condition is established when a shift lever for operating an automatic transmission is positioned at a traveling range (for example, drive (D) range) and the operation amount of a brake pedal becomes smaller than a specified amount. For example, when the vehicle is a manual transmission vehicle in the S&S control, the engine restart condition is established when stepping-in operation of a clutch pedal is performed.

Furthermore, the catalyst 53 may be an oxidation catalyst having an oxidation capacity.

What is claimed is:

1. A vehicle, comprising:
    an internal combustion engine including an exhaust passage;
    an electric motor that rotates the internal combustion engine;
    a catalyst provided in the exhaust passage and being configured to oxidize unburned fuel and being configured to store oxygen; and
    an electronic control unit, the electronic control unit being configured to, when the electronic control unit determines that an engine stop condition is established, stop fuel injection and increase a catalyst inflow oxygen amount that is an amount of oxygen flowing into the catalyst by a specified oxygen increase amount, the engine stop condition being a condition for stopping operation of the internal combustion engine, the specified oxygen increase amount being larger than an increased part of the catalyst inflow oxygen amount that is increased by the stop of the fuel injection, wherein
    when the electronic control unit determines that the engine stop condition is established, the electronic control unit is configured to increase the specified oxygen increase amount more as a temperature of the internal combustion engine is lower, and
    when the electronic control unit determines that the engine stop condition is established, the electronic control unit is configured to increase the catalyst inflow oxygen amount by the specified oxygen increase amount by rotating the internal combustion engine with the electric motor at a specified speed until a lapse of a first time, and is configured to increase the specified oxygen increase amount by increasing the specified speed more as the temperature of the internal combustion engine is lower, the first time being longer than an estimated time during which an amount of the unburned fuel flowing into the catalyst becomes zero after the fuel injection is stopped.

2. The vehicle according to claim 1, wherein
    the internal combustion engine includes a throttle valve, and
    when the electronic control unit determines that the engine stop condition is established, the electronic control unit is configured to increase the catalyst inflow oxygen amount by the specified oxygen increase amount by adjusting an opening degree of the throttle valve to be larger than an opening degree of the throttle valve at a time when the fuel injection is stopped.

3. The vehicle according to claim 1, further comprising
    an electric motor that rotates the internal combustion engine, wherein
    when the electronic control unit determines that the engine stop condition is established, the electronic control unit is configured to increase the catalyst inflow oxygen amount by the specified oxygen increase amount by rotating the internal combustion engine with the electric motor until a lapse of a first time, the first time being longer than an estimated time during which an amount of the unburned fuel flowing into the catalyst becomes zero after the fuel injection is stopped.

4. The vehicle according to claim 1, wherein
    the internal combustion engine includes a throttle valve, and
    when the electronic control unit determines that the engine stop condition is established, the electronic control unit is configured to increase the catalyst inflow oxygen amount by the specified oxygen increase amount by adjusting an opening degree of the throttle valve to be larger by a specified opening degree than the opening degree of the throttle valve at the time when the fuel injection is stopped, and is configured to increase the specified oxygen increase amount by setting the specified opening degree to a larger value as the temperature of the internal combustion engine is lower.

5. The vehicle according to claim 1, further comprising an electric motor that rotates the internal combustion engine, wherein
when the electronic control unit determines that the engine stop condition is established, the electronic control unit is configured to increase the catalyst inflow oxygen amount by the specified oxygen increase amount by rotating the internal combustion engine with the electric motor at a specified speed until a lapse of a first time, and is configured to increase the specified oxygen increase amount by increasing the first time more as the temperature of the internal combustion engine is lower, the first time being longer than an estimated time during which an amount of the unburned fuel flowing into the catalyst becomes zero after the fuel injection is stopped.

6. A vehicle, comprising:
an internal combustion engine including an exhaust passage;
a catalyst provided in the exhaust passage and being configured to oxidize unburned fuel and being configured to store oxygen; and
an electronic control unit, the electronic control unit being configured to, when the electronic control unit determines that an engine stop condition is established, stop fuel injection and increase a catalyst inflow oxygen amount that is an amount of oxygen flowing into the catalyst by a specified oxygen increase amount, the engine stop condition being a condition for stopping operation of the internal combustion engine, the specified oxygen increase amount being larger than an increased part of the catalyst inflow oxygen amount that is increased by the stop of the fuel injection, wherein
the electronic control unit is configured to stop fuel injection at a time when a second time that is a preset time elapses after the electronic control unit determines that the engine stop condition is established, and is also configured to set the second time to be shorter as a temperature of the internal combustion engine is lower.

7. A control method for a vehicle, the vehicle including an internal combustion engine including an exhaust passage, a catalyst provided in the exhaust passage and being configured to oxidize unburned fuel and to store oxygen, an electronic motor that rotates the internal combustion engine, and an electronic control unit,
the control method comprising, when the electronic control unit determines that an engine stop condition is established, the steps of:
stopping fuel injection and increasing a catalyst inflow oxygen amount that is an amount of oxygen flowing into the catalyst by a specified oxygen increase amount, wherein the engine stop condition being a condition for stopping operation of the internal combustion engine, and wherein the specified oxygen increase amount being larger than an increased part of the catalyst inflow oxygen amount that is increased by the stop of the fuel injection;
increasing the specified oxygen increase amount more as a temperature of the internal combustion engine is lower;
increasing the catalyst inflow oxygen amount by the specified oxygen increase amount by rotating the internal combustion engine with the electric motor at a specified speed until a lapse of a first time; and
increasing the specified oxygen increase amount by increasing the specified speed more as the temperature of the internal combustion engine is lower, the first time being longer than an estimated time during which an amount of the unburned fuel flowing into the catalyst becomes zero after the fuel injection is stopped.

* * * * *